United States Patent
Yeon et al.

(10) Patent No.: US 12,015,151 B2
(45) Date of Patent: Jun. 18, 2024

(54) COMPOSITE POSITIVE ELECTRODE ACTIVE MATERIAL, METHOD OF PREPARING THE SAME, POSITIVE ELECTRODE INCLUDING COMPOSITE POSITIVE ELECTRODE ACTIVE MATERIAL, AND LITHIUM BATTERY INCLUDING POSITIVE ELECTRODE

(71) Applicants: Samsung Electronics Co., Ltd., Suwon-si (KR); POSTECH ACADEMY-INDUSTRY FOUNDATION, Pohang-si (KR)

(72) Inventors: Donghee Yeon, Seoul (KR); Byoungwoo Kang, Pohang-si (KR); Junghwa Lee, Pohang-si (KR); Byungjin Choi, Seoul (KR); Sukgi Hong, Seongnam-si (KR); Jinsu Ha, Seongnam-si (KR)

(73) Assignees: SAMSUNG ELECTRONICS CO., LTD., Gyeonggi-Do (KR); POSTECH ACADEMY-INDUSTRY FOUNDATION, Pohang-si (KR)

(*) Notice: Subject to any disclaimer, the term of this patent is extended or adjusted under 35 U.S.C. 154(b) by 0 days.

(21) Appl. No.: 17/748,307

(22) Filed: May 19, 2022

(65) Prior Publication Data
US 2022/0278320 A1 Sep. 1, 2022

Related U.S. Application Data

(63) Continuation of application No. 16/589,490, filed on Oct. 1, 2019, now Pat. No. 11,362,330.

(30) Foreign Application Priority Data

Nov. 23, 2018 (KR) .................. 10-2018-0146770

(51) Int. Cl.
*H01M 4/505* (2010.01)
*H01M 4/02* (2006.01)
(Continued)

(52) U.S. Cl.
CPC ......... *H01M 4/505* (2013.01); *H01M 4/0471* (2013.01); *H01M 4/1391* (2013.01);
(Continued)

(58) Field of Classification Search
None
See application file for complete search history.

(56) References Cited

U.S. PATENT DOCUMENTS

| | | | |
|---|---|---|---|
| 6,040,090 A * | 3/2000 | Sunagawa | C01G 53/42 429/231.95 |
| 2004/0234854 A1 | 11/2004 | Kang et al. | |

(Continued)

FOREIGN PATENT DOCUMENTS

| CN | 102931390 A | 2/2013 |
|---|---|---|
| CN | 103413935 A | 11/2013 |

(Continued)

OTHER PUBLICATIONS

Machine translation of CN 103943844 A (Year: 2014).*

(Continued)

*Primary Examiner* — Robert S Carrico
(74) *Attorney, Agent, or Firm* — CANTOR COLBURN LLP

(57) ABSTRACT

A composite positive active material represented by Formula 1,

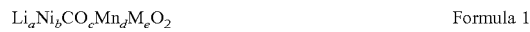
$$Li_aNi_bCo_cMn_dM_eO_2$$  Formula 1 wherein, in Formula 1, M is zirconium (Zr), aluminum (Al), rhenium (Re), vanadium (V), chromium (Cr), iron (Fe), gallium (Ga), silicon (Si), boron (B), ruthenium (Ru), tita- (Continued)

nium (Ti), niobium (Nb), molybdenum (Mo), magnesium (Mg), or platinum (Pt), $1.1 \leq a \leq 1.3$, $b+c+d+e \leq 1$, $0 \leq b \leq 0.3$, $0 \leq c \leq 0.3$, $0 < d \leq 0.6$, and $0 \leq e \leq 0.1$, wherein, through atomic interdiffusion of lithium and the metal, the composite positive active material has a uniform distribution of lithium excess regions and a uniform degree of disorder of metal cations, and the metal cations have a disordered, irregular arrangement at an atomic scale. Also a method of preparing the composite positive active material, a positive electrode including the composite positive active material, and a lithium battery including the positive electrode.

30 Claims, 12 Drawing Sheets

(51) Int. Cl.
*H01M 4/04* (2006.01)
*H01M 4/1391* (2010.01)
*H01M 4/36* (2006.01)
*H01M 4/525* (2010.01)
*H01M 10/0525* (2010.01)

(52) U.S. Cl.
CPC ............ *H01M 4/362* (2013.01); *H01M 4/525* (2013.01); *H01M 10/0525* (2013.01); *H01M 2004/028* (2013.01)

(56) References Cited

U.S. PATENT DOCUMENTS

| | | |
|---|---|---|
| 2005/0142442 A1 | 6/2005 | Yuasa et al. |
| 2009/0104530 A1 | 4/2009 | Shizuka et al. |
| 2011/0031437 A1 | 2/2011 | Nagase et al. |
| 2013/0248757 A1 | 9/2013 | Shim et al. |
| 2014/0227594 A1 | 8/2014 | Song et al. |
| 2018/0083262 A1 | 3/2018 | Zhou et al. |
| 2020/0321610 A1 | 10/2020 | Lee et al. |

FOREIGN PATENT DOCUMENTS

| | | | |
|---|---|---|---|
| CN | 103441238 A | | 12/2013 |
| CN | 103943844 A | * | 7/2014 |
| CN | 104852052 A | | 8/2015 |
| JP | 2005197004 A | | 7/2005 |
| JP | 2008103308 A | | 5/2008 |
| JP | 5669068 B2 | | 12/2014 |
| KR | 1020190082130 A | | 7/2019 |
| KR | 102007565 B1 | | 8/2019 |
| KR | 102116005 B1 | | 5/2020 |

OTHER PUBLICATIONS

Jena, Anirudha, et al. "Capacity Enhancement of the Quenched Li—Ni—Mn—Co Oxide High-Voltage Li-Ion Battery Positive Electrode." Electrochimica Acta, vol. 236, May 10, 2017, pp. 10-17, https://doi.org/10.1016/j.electacta.2017.03.163. (Year: 2017).*
Chinese Office Action for Chinese Patent Application No. 201910962056.8 dated Nov. 28, 2023.

* cited by examiner

PHASE 1
$LiNi_{0.5}Mn_{0.5}O_2$

PHASE 2
Li₂ MnO₃

PHASE 1
$aLi_{1+x}Ni_{0.5-x}Mn_{0.5}O_2$

PHASE 2
$bLi_{2-y}Ni_yMnO_3$

COMPOSITE POSITIVE ELECTRODE ACTIVE MATERIAL, METHOD OF PREPARING THE SAME, POSITIVE ELECTRODE INCLUDING COMPOSITE POSITIVE ELECTRODE ACTIVE MATERIAL, AND LITHIUM BATTERY INCLUDING POSITIVE ELECTRODE

CROSS-REFERENCE TO RELATED APPLICATION

This application as a continuation of U.S. patent application Ser. No. 16/589,490, filed on Oct. 1, 2019, and claims priority to and the benefit of Korean Patent Application No. 10-2018-0146770, filed on Nov. 23, 2018, in the Korean Intellectual Property Office, and all the benefits accruing therefrom under 35 U.S.C. § 119, the contents of which are incorporated herein in their entirety by reference.

BACKGROUND

1. Field

The present disclosure relates to a composite positive active material, a method of preparing the composite positive active material, a positive electrode including the composite positive active material, and a lithium battery including the positive electrode.

2. Description of the Related Art

Recently, there has been an explosive growth in market demand for lithium-based energy storage devices applicable to electric vehicles and which are capable of storing a large amount of electrical energy. To cope with this demand, research has been performed on lithium batteries having improved capacity. A lithium transition metal oxide having a layered structure may be used as the positive active material for such a lithium battery. However, the capacity of a lithium transition metal oxide having a layered structure is not satisfactory, and thus improvement is desired.

SUMMARY

Provided is a composite positive active material having improved capacity.

Provided is a method of preparing the composite positive active material.

Provided is a positive electrode including the composite positive active material.

Provided is a lithium battery having improved cell performance by inclusion of the positive electrode.

Additional aspects will be set forth in part in the description and, in part, will be apparent from the description, or may be learned by practice of the presented embodiments.

According to an aspect of an embodiment, there is provided a composite positive active material represented by Formula 1, $$Li_aNi_bCO_cMn_dM_eO_2 \qquad \text{Formula 1}$$

wherein, in Formula 1, M is zirconium (Zr), aluminum (Al), rhenium (Re), vanadium (V), chromium (Cr), iron (Fe), gallium (Ga), silicon (Si), boron (B), ruthenium (Ru), titanium (Ti), niobium (Nb), molybdenum (Mo), magnesium (Mg), or platinum (Pt), and $1.1 \leq a \leq 1.3$, $b+c+d+e \leq 1$, $0 \leq b \leq 0.3$, $0 \leq c \leq 0.3$, $0 < d \leq 0.6$, and $0 \leq e \leq 0.1$, wherein, through atomic interdiffusion of lithium and the metal, the composite positive active material has a uniform distribution of lithium excess regions and a uniform degree of disorder of metal cations, and the metal cations have a disordered, irregular arrangement at an atomic scale.

According to an aspect, a method of preparing a composite positive active material includes: mixing a precursor for forming a composite positive active material represented by Formula 1 to obtain a precursor mixture; pulverizing the precursor mixture to obtain a pulverized product; first thermally treating the pulverized product to obtain a first thermal treatment product; and cooling the first thermal treatment product, $$Li_aNi_bCO_cMn_dM_eO_2 \qquad \text{Formula 1}$$

wherein, in Formula 1, M is zirconium (Zr), aluminum (Al), rhenium (Re), vanadium (V), chromium (Cr), iron (Fe), gallium (Ga), silicon (Si), boron (B), ruthenium (Ru), titanium (Ti), niobium (Nb), molybdenum (Mo), magnesium (Mg), or platinum (Pt), $1.1 \leq a \leq 1.3$, $b+c+d+e \leq 1$, $0 \leq b \leq 0.3$, $0 \leq c \leq 0.3$, $0 < d \leq 0.6$, and $0 \leq e \leq 0.1$.

In an embodiment, the method may further include performing a second thermal treatment on the precursor mixture before the pulverizing of the precursor mixture.

In an embodiment, the first thermally treating and the second thermally treating may include contacting with an oxidizing gas at a temperature of about 700° C. or greater, for example, at a temperature of about 900° C. to about 1,100° C.

In an embodiment, the cooling may include cooling from a temperature of about 900° C. or greater, and at a cooling rate of about 500° C. per minute (° C./min) to about 900° C./min.

In an embodiment, the pulverizing may include ball milling, water milling, air-jet milling, or roller milling. Through the pulverizing, the pulverized product may have a particle size of about 1 micrometer (μm) or less, for example, about 0.001 μm to about 1 μm, for example, about 0.05 μm to about 0.9 μm, or for example, about 0.2 μm to about 0.5 μm, when determined by light scattering.

In an embodiment, the precursor mixture may include a lithium precursor, a nickel precursor, and a manganese precursor, and the mixing of the precursor mixture may include adding the lithium precursor to a mixture of the nickel precursor and the manganese precursor to obtain the precursor mixture; or may include simultaneously adding and mixing the lithium precursor, the nickel precursor, and the manganese precursor.

In an embodiment, the mixing of the precursor mixture may include mechanical milling. The method may further include, before the first thermally treating of the pulverized product, drying the pulverized product at a temperature of about 100° C. or less to obtain a dried product, and pelletizing the dried product.

According to an aspect, a positive electrode includes the composite positive active material.

According to an aspect, a lithium battery includes a positive electrode, a negative electrode, and an electrolyte between the positive electrode and the negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
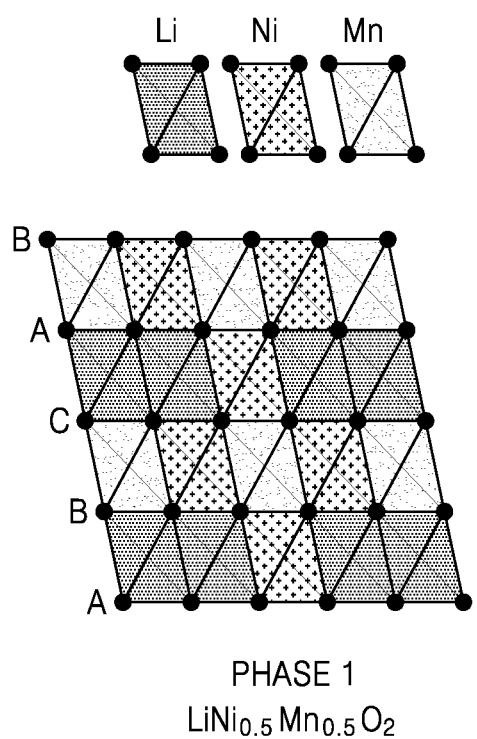
FIG. 1A is an illustration of an embodiment of the $LiNi_{0.5}Mn_{0.5}O_2$ structure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of" when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite positive active material, a method of preparing the composite positive active material, a positive electrode including the composite positive active material, and a lithium battery including the positive electrode will be described in greater detail.

According to an aspect, there is provided a composite positive active material represented by Formula 1, $$Li_aNi_bCO_cMn_dM_eO_2 \quad \text{Formula 1}$$

wherein, in Formula 1, M is zirconium (Zr), aluminum (Al), rhenium (Re), vanadium (V), chromium (Cr), iron (Fe), gallium (Ga), silicon (Si), boron (B), ruthenium (Ru), titanium (Ti), niobium (Nb), molybdenum (Mo), magnesium (Mg), platinum (Pt), or a combination thereof, $1.1 \leq a \leq 1.3$, $b+c+d+e \leq 1$, $0 \leq b \leq 0.3$, $0 \leq c \leq 0.3$, $0 < d \leq 0.6$, and $0 \leq e \leq 0.1$, wherein, through atomic interdiffusion of lithium and the metal, the composite positive active material has a uniform distribution of lithium excess regions and a uniform degree of disorder of metal cations, and the metal cations have a disordered, irregular arrangement at an atomic scale. The uniform distribution of the lithium excess regions and the uniform degree of disorder of metal cations may be a product of atomic interdiffusion of lithium and the metal M.

The metal M may be gallium (Ga) or a transition metal. The transition metal may be, for example, Ni, Co, Mn, M (i.e., one of zirconium (Zr), vanadium (V), chromium (Cr), iron (Fe), ruthenium (Ru), titanium (Ti), niobium (Nb), molybdenum (Mo), or platinum (Pt) or a combination thereof.

In Formula 1, when e is 0, the transition metal may be Ni, Co, Mn or a combination thereof.

In Formula 1, when e is not 0, the metal M may be gallium (Ga) or a transition metal, and the transition metal may be Ni, Co, Mn, M (i.e., at least one of zirconium (Zr), vanadium (V), chromium (Cr), iron (Fe), ruthenium (Ru), titanium (Ti), niobium (Nb), molybdenum (Mo), platinum (Pt), or a combination thereof.

In Formula 1, $0 < b+c+d+e \leq 1$, for example, $0.1 \leq b+c+d+e \leq 1$, for example, $0.2 \leq b+c+d+e \leq 1$, for example, $0.3 \leq b+c+d+e \leq 1$.

As used herein, the term "metal cation" refers to a cation of Li, Ni, Co, Mn, or M.

In Formula 1, b may be, for example, from about 0.1 to about 0.2.

According to a known energy storage method, electrons for intercalation and deintercalation of lithium ions in a lithium metal oxide originate primarily from the transition metal of the lithium metal oxide. Accordingly, the amount of energy that is storable may be determined according to the number of electrons which can be supplied or released from the transition metal (i.e., change in oxidation number of the transition metal) to provide stable intercalation/deintercalation of lithium, for example. However, when a lithium-excess lithium transition metal composite oxide is used, it may be difficult to obtain the desired high capacity due to a relatively reduced amount of the transition metal.

To significantly increase the electrochemical energy storage capacity of a lithium transition metal composite oxide having a layered phase structure, it may be advantageous to simultaneously increase both the amount of reversibly usable electrons for the electrochemical reaction and the amount of reversibly intercalated/deintercalated lithium. In a lithium transition metal composite oxide of the formula $Li_{1+x}TM_{1-x}O_2$, wherein TM denotes a transition metal, disintegration of the layered phase structure or a phase change may occur during the deintercalation of lithium, such that the entire amount of lithium may not be released.

To address the above-described drawbacks, the inventors provide a composite positive active material having improved cycle stability and increased lithium intercalation/deintercalation reversibility so that intercalation/deintercalation of a greater amount of lithium may occur. In particular, the stability of the composite positive active material having a layered phase structure is significantly improved.

While not wanting to be bound by theory, it is understood that the improved stability is a result of controlling a degree of cation disorder and/or by changing a local arrangement of the elements.

While not wanting to be bound by theory, it is understood that the composite positive active material may be a multiple oxidation/reduction (redox)-based, high-capacity positive active material in which redox reactions of oxygen are increased significantly by generating localized regions of excess lithium, and in which a cation-disordered structure is provided throughout the entire composite positive active material, such as by controlling an arrangement of lithium and a transition metal of the lithium-excess positive active material.

Figure 1B:
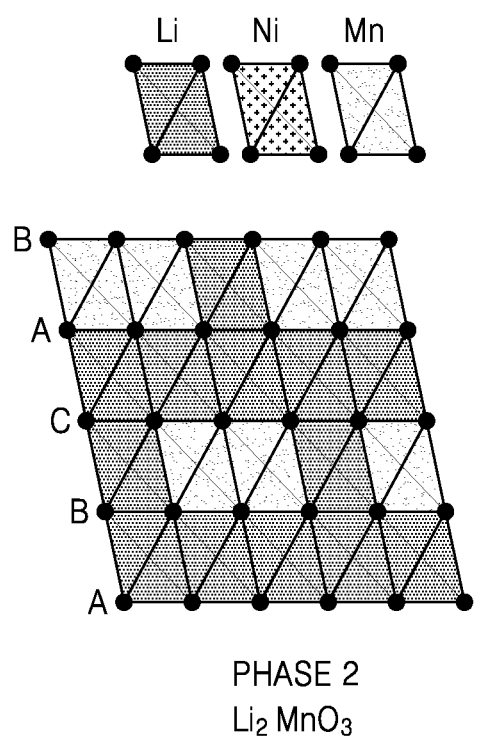
FIG. 1B is an illustration of an embodiment of the $Li_2MnO_3$ structure.

FIGS. 1A and 1B illustrate a crystal structure of a lithium-excess composite positive active material of the formula $Li_2MnO_3$—$LiMeO_2$), specifically $Li_2MnO_3$—$LiNi_{0.5}Mn_{0.5}O_2$.

Figure 2:
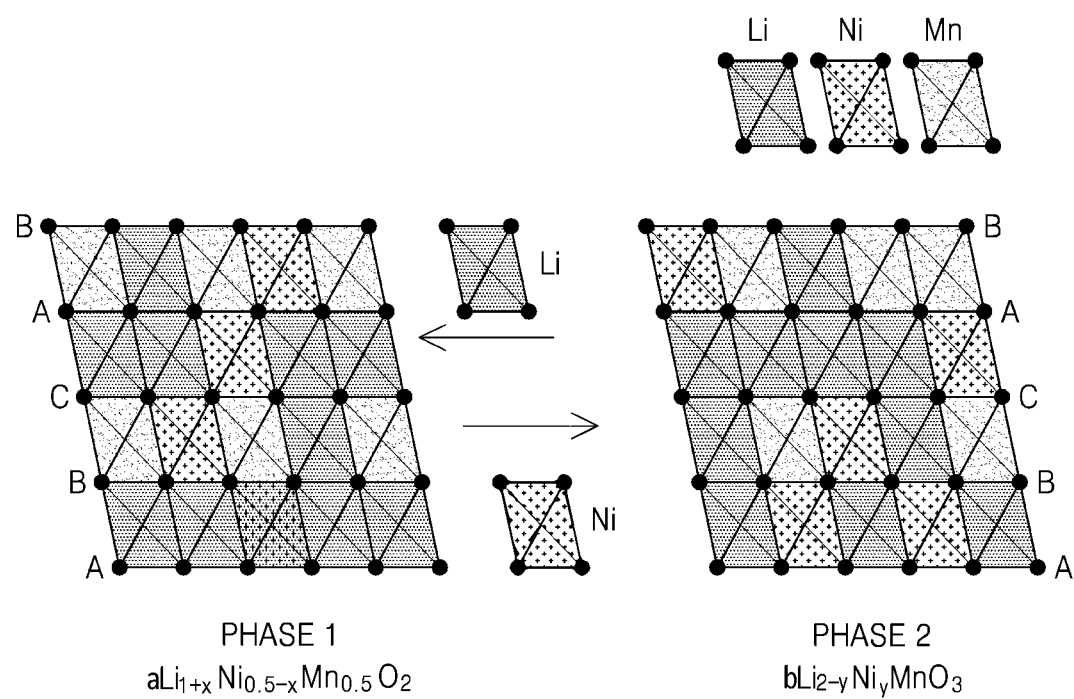
FIG. 2 is an illustration of an embodiment of a crystal structure of a composite positive active material.

FIG. 2 is an illustration of a crystal structure of a composite positive active material according to Formula 2.

$$aLi_{1+x}Ni_{0.5-x}Mn_{0.5}O_2 \cdot bLi_{2-y}Ni_yMnO_3 \quad \text{Formula 2}$$

In Formula 2, $0 \leq x < 0.2$, $0 \leq y < 0.2$, for example, x may be about 0.1 to about 0.2, y may be about 0.1 to about 0.2, $0 < a < 1$, $0 < b < 1$, $a+b=1$, and $ax=by$.

In Formula 2, a and b denote a content of the phases $Li_{1+x}Ni_{0.5-x}Mn_{0.5}O_2$ and $Li_{2-y}Ni_yMnO_3$, respectively, and a and b may each independently be about 0.01 to about 0.99, for example, about 0.1 to about 0.9, for example, about 0.2 to about 0.8, for example, about 0.3 to about 0.7, for example, about 0.4 to about 0.6, or for example, about 0.5.

Referring to FIGS. 1A and 1B, the composite positive active material may include a phase of the formula $LiMeO_2$, e.g., $LiNi_{0.5}Mn_{0.5}O_2$, having a layered structure and a lithium-excess layered structure of the formula $Li_2MO_3$. The $LiNi_{0.5}Mn_{0.5}O_2$ phase of the two phases may have a cation-disordered structure, without excess lithium. While not wanting to be bound by theory, it is understood that oxidation/reduction reaction of oxygen does not occur in the $LiNi_{0.5}Mn_{0.5}O_2$ phase. The $Li_2MnO_3$ phase may not have a cation-disordered structure, and may include excess lithium, and thus oxidation/reduction of oxygen may occur in the $Li_2MnO_3$ phase. As illustrated in FIGS. 1A and 1B, in the composite positive active material of FIGS. 1A and 1B, the cation-disordered structure and the lithium-excess regions are localized, and the oxidation/reduction reaction of oxygen may occur only in partial regions of the composite positive active material. As illustrated in FIGS. 1A and 1B, the composite positive active material may have a Li—O—Li structure only in the $Li_2MnO_3$ phase, which is a phase corresponding to the lithium-excess region among the two phases.

As illustrated in FIG. 2, the composite positive active material according to an embodiment may have a more uniform distribution of Li and the transition metal Ni, for example, through atom interdiffusion, and the metal cations may have a disordered, irregular arrangement on an atomic scale.

As used herein, the expression "have a uniform distribution of lithium excess regions and a uniform degree of disorder of metal cations through atom interdiffusion of lithium and a metal" may indicate that a distribution of lithium-excess regions and a degree of disorder of the metal cations are the same, between phase 1 and phase 2, e.g., due to interdiffusion of lithium ions and transition metal cations, as illustrated in FIG. 2. The metal is for example a transition metal.

As used herein, the expression that "the metal cations have a disordered, irregular arrangement on an atomic scale" may indicate that a Li layer and a transition metal layer are uniformly distributed such that ordering of the Li layer and the transition metal layer is not detectable by X-ray or microscopic analysis, and thus cannot be without clear distinguished from one another due to the interdiffusion of lithium and the metal. The metal is for example a transition metal.

In the composite positive active material according to an embodiment, the "uniform distribution of the lithium-excess regions and a uniform degree of disorder of the metal cations through atom interdiffusion of lithium and the metal" may be identified based on the results of X-ray diffraction (XRD) analysis, and the fact that the metal cations may have a disordered, irregular arrangement at an atomic scale may be identified using high-angle annular dark-field/annular bright-field imaging (HAADF/ABF)-scanning transmission electron microscopy (STEM), e.g., that cation ordering is not observed by (HAADF/ABF)-STEM. The metal is for example a transition metal.

In an embodiment, the composite positive active material, for example, a Li-excess positive active material of $Li_2MnO_3$—$LiMeO_2$, may have a cation-disordered structure throughout the entirety of the positive active material due to exchange of Li and the transition metal between a $Li_2MnO_3$ phase and a $LiMeO_2$ phase, so that migration path of Li may be improved and the composite positive active material may better participate in an electrochemical reaction. In addition, the transition metals, such as Mn and Ni, may participate in forming a Li—O—Li structure. As a result, the composite positive active material according an embodiment may facilitate formation of the Li—O—Li structure, as compared with a positive active material of the formula $Li_2MnO_3$—$LiNi_{0.5}Mn_{0.5}O_2$, and may include more Li—O—Li structure. Due to the increase of the Li—O—Li structure, oxygen ions may better participate in oxidation/reduction reactions, which may increase the amount of available electrons, and consequently increase the energy storage capacity. As such, the composite positive active material according to an embodiment may facilitate the oxidation/reduction reaction of oxygen, may be structurally stable, and may effectively suppress a voltage reduction. The composite positive active material according to an embodiment may result in improved structural stability through control of a local arrangement of elements, and thus significantly increase the reversibility of lithium intercalation/deintercalation reactions, and improve cycle characteristics.

The composite positive active material according to an embodiment may be a composite represented by Formula 2, as illustrated in FIG. 2, prepared by high-temperature thermal treatment and rapid cooling (quenching) processes, which may allow exchange of Li and the transition metal, for example, between the $Li_2MnO_3$ phase and the $LiMeO_2$ phase in a Li-excess positive active material of the formula $Li_2MnO_3$—$LiMeO_2$, as illustrated in FIGS. 1A and 1B, and thus may provide improved oxidation/reduction (redox) of oxygen. Unlike the positive active material of FIGS. 1A and 1B, which do not have the desired cation distribution characteristics, the composite positive active material of FIG. 2 according to an embodiment may have improved cation distribution, e.g., a cation distribution resulting from interdiffusion.

$$aLi_{1+x}Ni_{0.5-x}Mn_{0.5}O_2 \cdot bLi_{2-y}Ni_yMnO_3 \quad \text{Formula 2}$$

In Formula 2, $0 \le x < 0.2$, $0 \le y < 0.2$, for example, x may be about 0.1 to about 0.2, y may be about 0.1 to about 0.2, $0 < a < 1$, $0 < b < 1$, $a+b=1$, and $ax=by$.

In Formula 2, a and b may each independently be about 0.1 to about 0.9, for example, about 0.2 to about 0.8, for example, about 0.3 to about 0.7, for example, about 0.4 to about 0.6, or for example, about 0.5.

In the composite represented by Formula 2 according to an embodiment, a degree of exchange of lithium and transition metal cations between the $Li_{1+x}Ni_{0.5-x}Mn_{0.5}O_2$ and $Li_{2-y}Ni_yMnO_3$ phases, and a cation mixing may be identified based on the results of XRD analysis.

In the composite positive active material according to an embodiment, a ratio of $I(44.x°)/I(44.y°)$ may be about 0.2 or less, for example, greater than 0 and less than or equal to 0.2, for example, about 0.001 to about 0.2, or for example, about 0.008 to about 0.2. The ratio $I(44.x°)/I(44.y°)$, indicates a ratio of the intensity of a peak A in a shoulder region at about 44° 2θ, to the intensity of peak B, a main peak at about 44° 2θ. From this intensity ratio of the peaks A and B, a degree of merging or separation of the two peaks may be found. As used herein, the "main peak" may refer to a peak having the largest intensity. "$I(44.x°)$" refers to the intensity of a peak in a shoulder region at about 44° 2θ, and "$I(44.y°)$" refers to the intensity of a main peak at about 44° 2θ.

While not wanting to be bound by theory, it is understood that $I(44.x°)$ is the intensity of a peak related with the $Li_2MnO_3$ phase, and $I(44.y°)$ is the intensity of a peak associated with the $LiMO_2$ phase. The $LiMO_2$ phase may refer to, for example, the $LiNi_{0.5}Mn_{0.5}O_2$ phase of FIG. 1A. When the two peaks A and B are merged the composite positive active material may have a solid solution structure, a product of atomic interdiffusion. When the two peaks A and B are separated from one another, this may mean that the composite positive active material has a structure similar to a composite having an Li-rich layered (OLO) structure in which the lithium excess regions and/or the metal cations are ordered.

In the composite positive active material according to an embodiment, a full width at half-maximum (FWHM) of a peak between 43° 2θ and 45° 2θ of the composite positive active material may be about 0.2° to about 0.32°, for example, about 0.21° to about 0.32°, or for example, about 0.24° to about 0.32° 2θ, when analyzed by XRD diffraction using Cu Kα radiation. When a FWHM is within these ranges, the composite positive active material may have a solid solution structure, e.g., as provided by a reaction caused by atom interdiffusion between the two phases.

In the composite positive active material according to an embodiment, a ratio of $I_{(003)}/I_{(104)}$ may be about 1.35 or less, for example, about 0.8 to about 1.33, or for example, about 0.87 to about 1.31, when analyzed by XRD diffraction using Cu Kα radiation. When a ratio of $I_{(003)}/I_{(104)}$ is within these ranges, the composite positive active material may have a layered phase structure in which a Li layer and a transition metal layer are not distinguishable from one another by XRD, HAADF/ABF-STEM, or both, and may have a disordered, irregular arrangement of lithium and the transition metal.

The composite positive active material according to an embodiment, a lithium composite oxide having a Li-rich layered phase structure may have a disordered cation mixed structure and a layered phase structure in which the transition metal layer and the lithium layer are not clearly distinguished from one another. The composite positive active material having such structures may include a single phase or a plurality of phases, e.g., two phases. The composite positive active material according to an embodiment may be, for example, $Li_{1.2}Ni_{0.2}Mn_{0.6}O_2$, $Li_{1.2}Ni_{0.3}Mn_{0.3}O_2$, $Li_{1.1}Ni_{0.3}Mn_{0.6}O_2$, or a combination thereof.

The composite positive active material may be a high-capacity material having a capacity of about 275 milliampere-hours per gram (mAh/g) or greater, for example, about 300 mAh/g or greater.

In an embodiment, the composite positive active material may have a degree of Ni disorder. A lithium battery having improved cycle efficiency and capacity characteristics may be manufactured using the composite positive active material.

The degree of Ni disorder may be determined from the amount of Ni ion disorder in Li sites during preparation of the composite positive active material. In particular, the degree of Ni disorder may be obtained by analyzing an atomic structure using the Rietveld method, determining a relative amount of $Ni^{2+}$ ions occupying Li sites based on the Rietveld analysis, determining the occupancy of oxygen sites by oxygen, e.g., by diffraction obtained from sample patterns, and then determining the amount of Ni ion disorder on Li sites during the synthesis process.

In an embodiment, the composite positive active material may have an average particle diameter ($D_{50}$) of about 0.2 micrometer (μm) to about 0.5 μm. The average particle diameter ($D_{50}$) may be defined as an average particle diameter of the particles at 50% in a cumulative particle size distribution. In an embodiment, the average particle diameter ($D_{50}$) of the composite positive active material may be measured using electron microscopy, for example, scanning electron microscopy (SEM) or field-emission scanning electron microscopy (FE-SEM), or using a laser diffraction method.

For example, when the laser diffraction method is used, the average particle diameter ($D_{50}$) of 50% of the particles in a cumulative particle size distribution may be calculated by dispersing particles of the composite positive active materials in a dispersion medium and then radiating ultrasonic waves of about 28 kilohertz (kHz) with an output power of 60 watts (W) using a laser diffraction particle size analyzer (for example, Microtrac MT 3000).

According to an embodiment, methods of preparing the composite positive active material according to any of the foregoing will be described with reference to the appended drawings.

Figure 3:
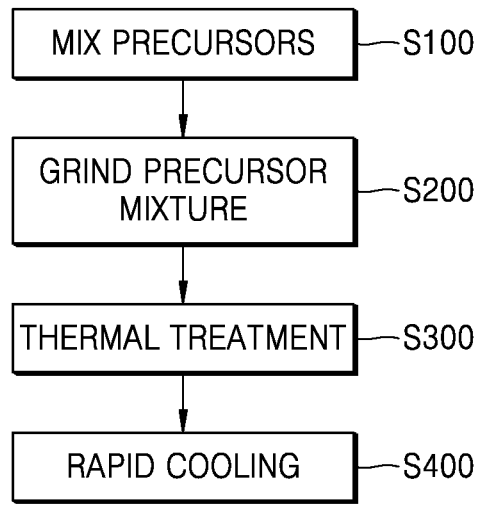
FIG. 3 is a flowchart of an embodiment of a method of preparing a composite positive active material.

FIG. 3 is a flowchart illustrating a first method of preparing a composite positive active material. Referring to FIG. 3, precursors for the synthesis of a composite positive active material of Formula 1 may be mixed together to obtain a precursor mixture (S100).

Formula 1

In Formula 1, M is zirconium (Zr), aluminum (Al), rhenium (Re), vanadium (V), chromium (Cr), iron (Fe), gallium (Ga), silicon (Si), boron (B), ruthenium (Ru), titanium (Ti), niobium (Nb), molybdenum (Mo), magnesium (Mg), or platinum (Pt), $1.1 \leq a \leq 1.3$, $b+c+d+e \leq 1$, $0 \leq b \leq 0.3$, $0 \leq c \leq 0.3$, $0 < d \leq 0.6$, and $0 \leq e \leq 0.1$.

In Formula 1, when c and e are 0, the precursors may include a lithium (Li) precursor, a nickel (Ni) precursor, and a manganese (Mn) precursor.

Depending on the order of addition of the precursors, a thermal treatment temperature, a degree of mixing, or the like, a degree of distribution of atomic interdiffusion in the composite positive active material may be varied, and accordingly, composite positive active materials having different electrochemical characteristics may be prepared.

The mixing of the precursor mixture may include adding the lithium precursor into a mixture of the nickel precursor and the manganese precursor; or simultaneously adding and mixing the lithium precursor, the nickel precursor, and the manganese precursor. When the nickel precursor and the lithium precursor are first mixed together before adding the manganese precursor, it may be difficult to attain desired cation interdiffusion distribution characteristics.

The mixing of the precursors to obtain the precursor mixture may be performed using mechanical milling. This mechanical milling may be performed so that the agglomerated powder of each precursor was disintegrated, to thereby obtain a uniform precursor mixture. The mechanical milling may be performed using, for example, a roll mill, a ball mill, a high-energy ball mill, a planetary mill, a stirred ball mill, a vibrating mill, or a jet mill, to thereby mix the precursors by mechanical friction. For example, the mechanical milling may be performed, for example, at about 100 revolutions per minute (rpm) to about 1000 rpm to mechanically apply a compression stress. In the mechanical milling, a solvent such as acetone may be added.

After the mechanical milling, drying may be performed at a temperature of about 100° C. or less, for example, a temperature of about 80° C. to about 100° C. During drying, the solvent added in the mechanical milling may be removed so that the precursors of the precursor mixture may be uniformly mixed together in a subsequent pulverizing process.

Next, the precursor mixture may be pulverized (S200). The pulverizing of the precursor mixture assists in obtaining a composite positive active material having a desired atom interdiffusion structure. The pulverizing may be performed by a chemical or physical process of reducing a particle size of the powder of the precursor mixture, for example, using a high-energy ball mill, a high-pressure water mill, an air-jet mill, a roller mill, or the like. The pulverizing may be performed for, for example, about 1 hours to about 9 hours, for example, about 2 hours to about 6 hours or about 2 hours to about 3 hours.

Through the pulverizing, the pulverized product can have a particle size of about 1 μm or less, for example, about 0.2 μm to about 0.5 μm. The particle size may refer to an average particle diameter of the pulverized product when the pulverized product particle is spherical or may refer to a length of the major axis when the pulverized product particle is non-spherical.

Next, the pulverized product may be subjected to a first thermal treatment to obtain a first thermal treatment product (S300), and then the first thermal treatment product may be rapidly cooled through a quenching process (S400).

As used herein, the term "rapid cooling" may refer to a rapid cooling process using a cooling member, and is distinct from natural cooling by convection in air, for example. For example, the cooling rate may be about 900° C./min or less, for example, about 500° C./min to about 900° C./min, about 550° C./min to about 850° C./min, or about 600° C./min to about 800° C./min.

The first thermal treatment may be performed under an oxidizing gas atmosphere at a temperature of about 700° C. or greater, for example, about 700° C. to about 1100° C., or for example, about 900° C. to about 1,050° C. The oxidizing gas atmosphere may be an air atmosphere or an oxygen atmosphere. When the first thermal treatment is performed under the above-described conditions, a composite positive active material having desirable atom interdiffusion cation distribution may be obtained.

The rapid cooling may be performed at a temperature of about 900° C. or greater, for example, a temperature of about 900° C. to about 1,000° C. When the rapid cooling is performed within these temperature ranges, a composite positive active material with a uniform distribution of the Li-excess regions, transition metal regions, and cation mixing may be obtained. However, when natural cooling or slow cooling is performed without the above-described rapid cooling, a composite positive active material with a non-uniform distribution of the Li-excess regions, the transition metal regions, and the cation mixing may be obtained.

The above-described rapid cooling may effectively prevent conversion of a composite positive active material with a stable crystal structure obtained at high temperature into a composite positive active material having non-uniform phases with localized distribution of Li-excess regions and disordered transition metal regions, as shown in FIGS. 1A and 1B, such that the composite positive active material having a cationic interdiffusion distribution as illustrated in FIG. 2 may be stably obtained.

In an embodiment, before the mixing of the precursors (S100), each of the precursors may be subjected to a pre-treatment process, for example, mixing and drying of precursors, and a pelletizing process.

For example, the mixing of the precursors may include separately adding each of the metal precursors into a solvent and mixing the respective precursor and solvent together using a ball mill. The ball milling may be performed for about 6 hours to about 24 hours. When the ball milling is performed for less than 6 hours, dissolution, pulverizing, or mixing of the precursors with the solvent may be insufficient. When the ball milling is performed for over 24 hours, the process time is prolonged even after a saturated mixing effect is attained, which may be uneconomical.

The solvent may be, for example, acetone or water. However, any suitable solvent, e.g., a solvent which may ensure appropriate mixing of the precursors and may not affect subsequent processes, may be used without limitation. When the prepared precursors may form a uniform mixture with the solvent without ball milling, the precursors may be prepared through simple stirring.

The drying process of the pre-treatment process includes heating at a predetermined temperature and removing the solvent from the mixture of the precursors prepared by the mixing process. The drying process may include heating the individual precursor solvent mixture including the solvent at a temperature of less than 100° C. using a device such as a hot plate. When the heating is performed above 100° C., a different, undesired phase may be formed due to reaction of the precursors.

The pelletizing process of the pre-treatment process may facilitate discharge of a gaseous component that can decompose in a subsequent process, thereby simplifying the synthesis of the composite positive active material. Pellets having an average diameter of about 1 centimeter (cm) may be formed using a pelletizer. However, in the pelletizing process, the diameter of the pellets are not specifically limited.

For example, the lithium precursor may include $Li_2CO_3$, $LiNO_3$, and the like. Such metal precursors may provide metal components to a composition represented by Formula 1. The manganese precursor and the nickel precursor may include materials capable of synthesizing the composite positive active material through heating. The manganese precursor may be, for example, manganese chloride, manganese sulfate, manganese acetate, manganese nitrate, or a combination thereof. The nickel precursor may be, for example, nickel chloride, nickel carbonate, nickel nitrate, nickel sulfate, or a combination thereof.

The pulverizing of the precursor mixture (S200) may include mechanical pulverizing with a high-energy ball mill. In the pulverizing of the precursor mixture (S200), the mechanical milling may facilitate reaction activation through a process of further increasing atomic interdiffusion between a lithium layered phase structure ($LiMeO_2$) and a Li-excess layered phase structure ($Li_2MO_3$), which are components of layered phase structures. That is, the mechanical milling may further increase reaction activation.

The pulverizing of the precursor mixture may be performed for about 2 hours to about 3 hours through an additional chemical or physical process of reducing the particle size of the precursor mixture powder, for example, using a high-energy ball mill, a high-pressure water mill, an air-jet mill, or a roller mill.

In the first thermal treatment (S300), heating may be performed at a temperature of about 700° C. to facilitate interaction between the components of the composite positive active material. When the heating time is too long, the particle size may become too large to induce an initial activation process. The first thermal treatment may be performed for, for example, about 5 hours to about 10 hours.

During the rapid cooling (S400), quenching after the thermal treatment may be performed. The quenching may be performed at a rapid cooling rate to maintain interaction between the solubility of the elements in each of the layered phase structure components and the electrochemical activity of anions in the layered phase structures.

When slow cooling is performed, due to a solubility change of the elements in each phase, the electrochemical activity of anions in the layered phase structure material may also be changed, so that a lithium composite oxide having a common Li-rich layered phase structure with a low reaction activity of anions may be obtained. Accordingly, the quenching, as a process of maintaining the structure or composition of a mixture at a high temperature, may be performed using any rapid cooling method capable of maintaining a stable phase. The quenching is not specifically limited by differences in the synthesis method. That is, when the quenching is performed at a rapid cooling rate, it may be possible to prevent conversion of a composite positive active material having a stable phase at a high temperature into a composite positive active material having a different crystalline structure stable at a low temperature.

According to the first preparation method of FIG. 3, a composite positive material having an interdiffusion structure of lithium and the transition metal may be prepared from the mixture of the precursors. The composite positive active material may have a phase as illustrated in FIG. 2 and a uniform distribution of excess lithium and a mixed structure of lithium cations and transition metal cations over the entire area of the composite positive active material. Due to this structure, reaction of cations and anions may be activated and high-capacity characteristics may be implemented.

Figure 4:
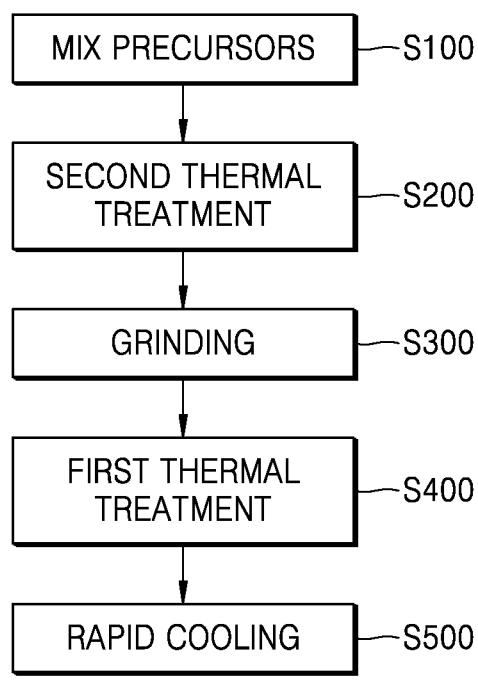
FIG. 4 is a flowchart of an embodiment of a method of preparing a composite positive active material.
Figure 5A:
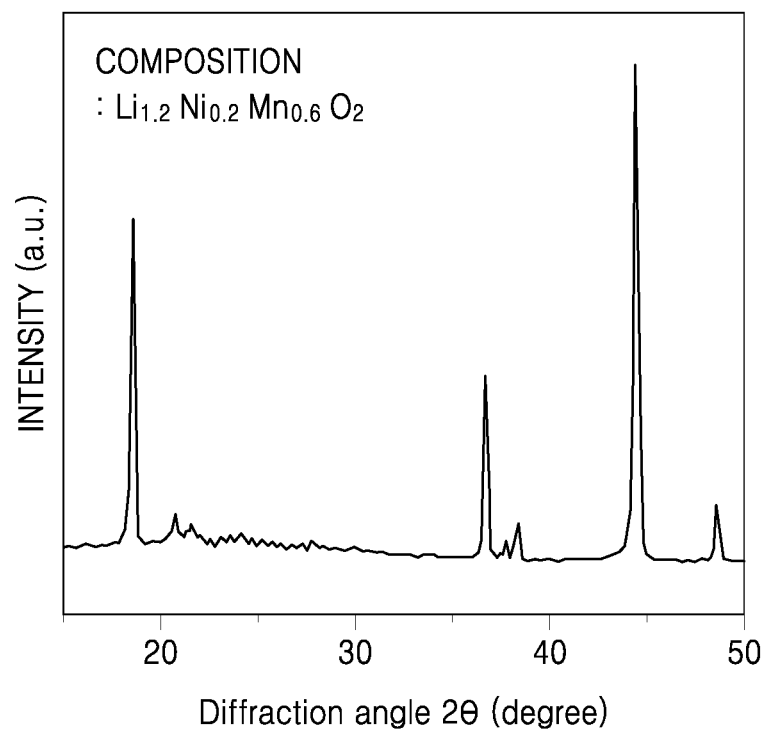
FIGS. 5A, 6A, and 7A are each a graph of intensity (arbitrary units, a.u.) versus diffraction angle (degrees 2θ) illustrating the results of X-ray diffraction (XRD) analysis of composite positive active materials obtained according to Examples 1 to 3, respectively.
Figure 5B:
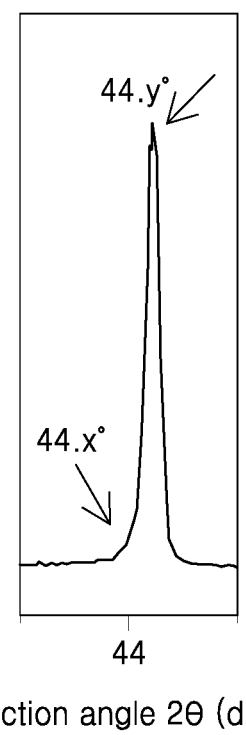
FIGS. 5B, 6B, and 7B are expanded views of a portion of FIGS. 5A, 6A, and 7A, respectively.
Figure 6A:
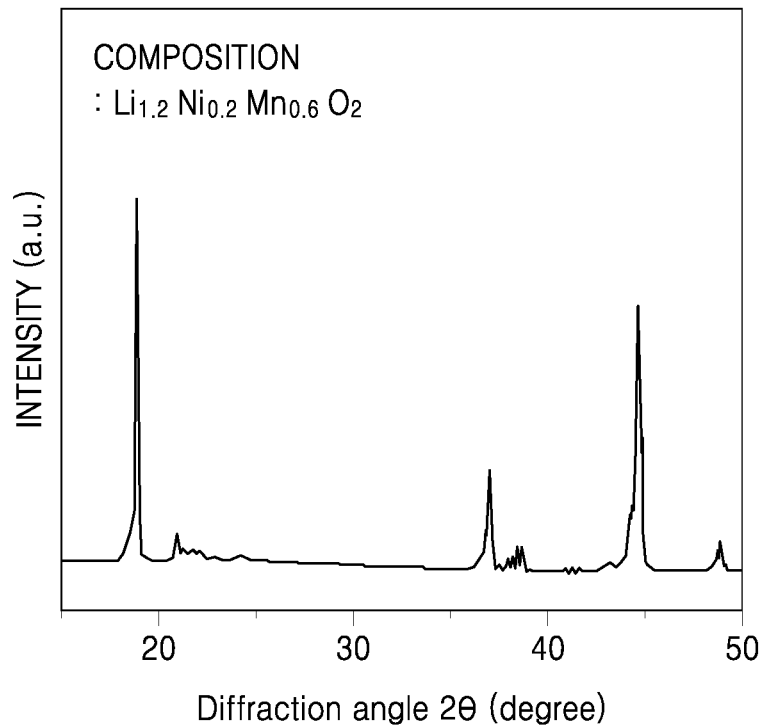
Figure 6B:
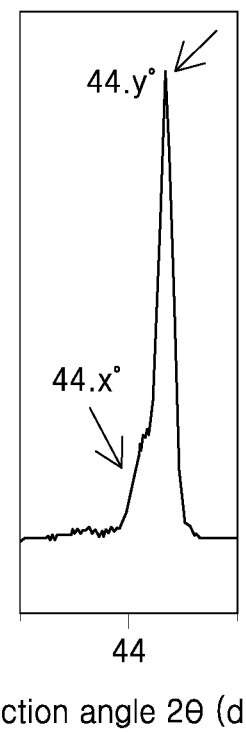
Figure 7A:
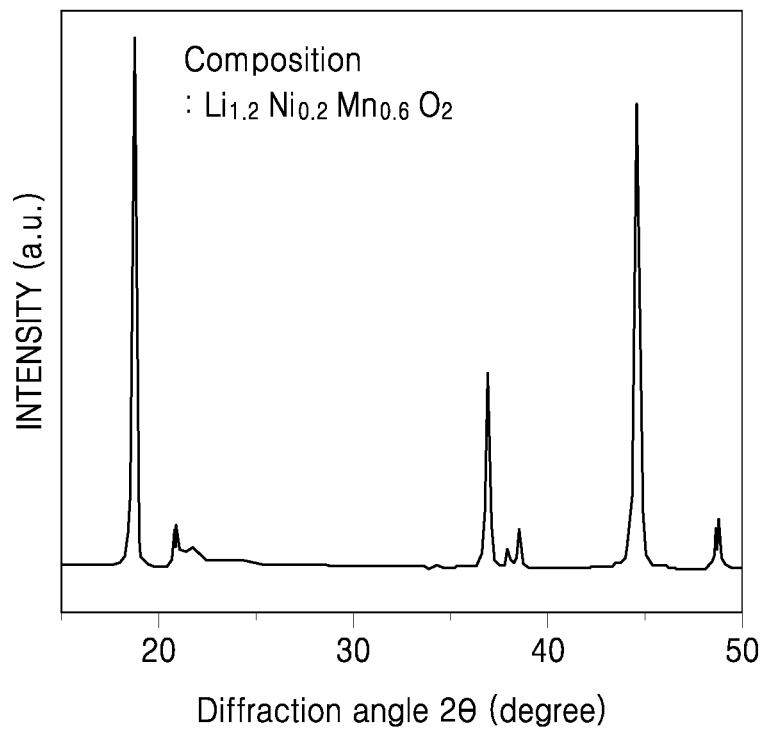
Figure 7B:
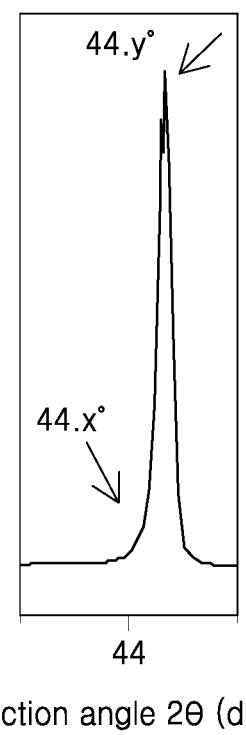
Figure 8A:
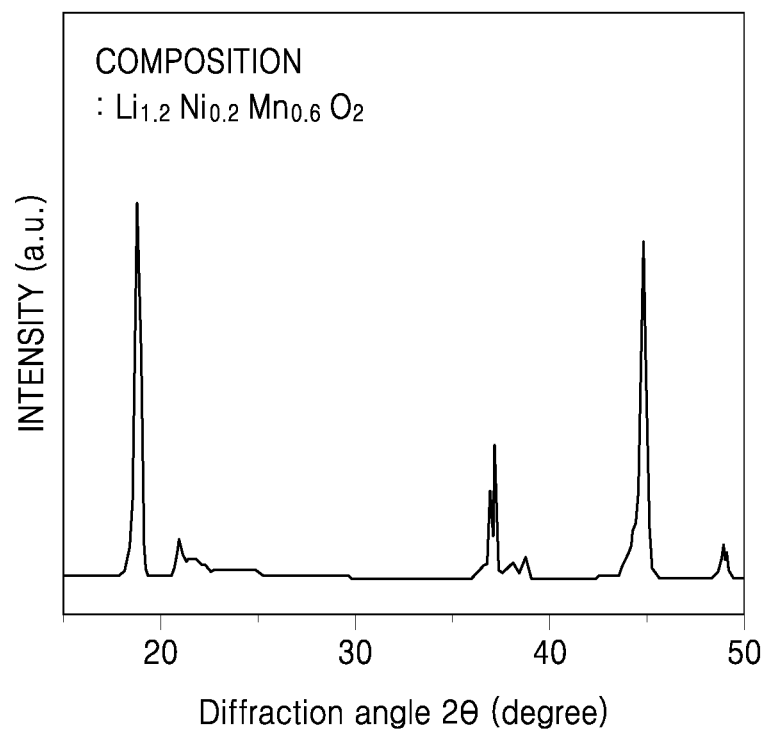
FIGS. 8A, 9A, and 10A are each a graph of intensity (arbitrary units, a.u.) versus diffraction angle (degrees 2θ) illustrating the results of XRD analysis of composite positive active materials obtained according to Comparative Examples 1 to 3, respectively.
Figure 8B:
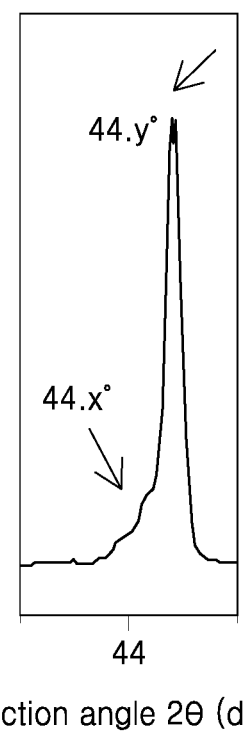
FIGS. 8B, 9B, and 10B are expanded views of a portion of FIGS. 8A, 9A, and 10A, respectively.
Figure 9A:
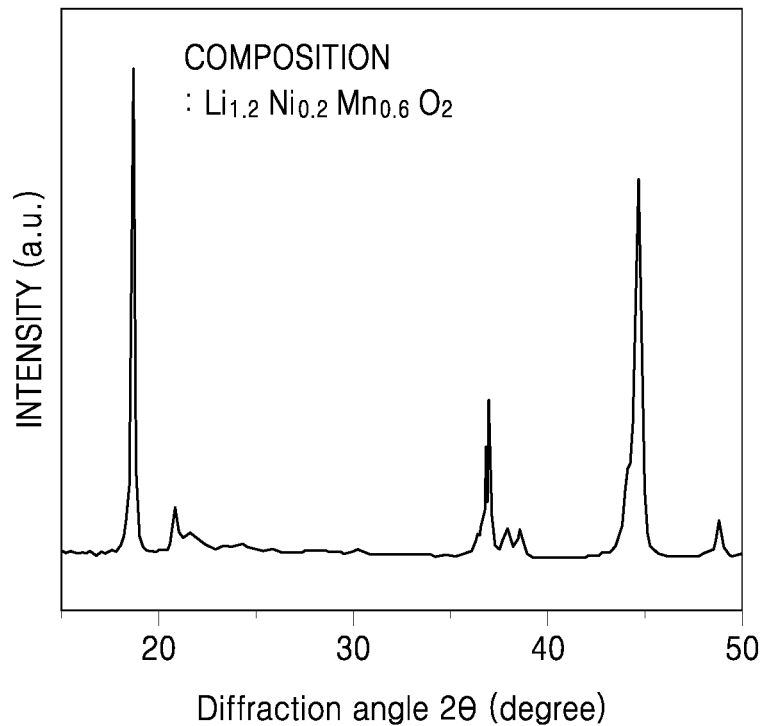
Figure 9B:
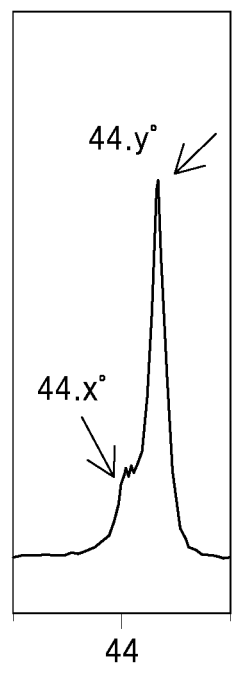
Figure 10A:
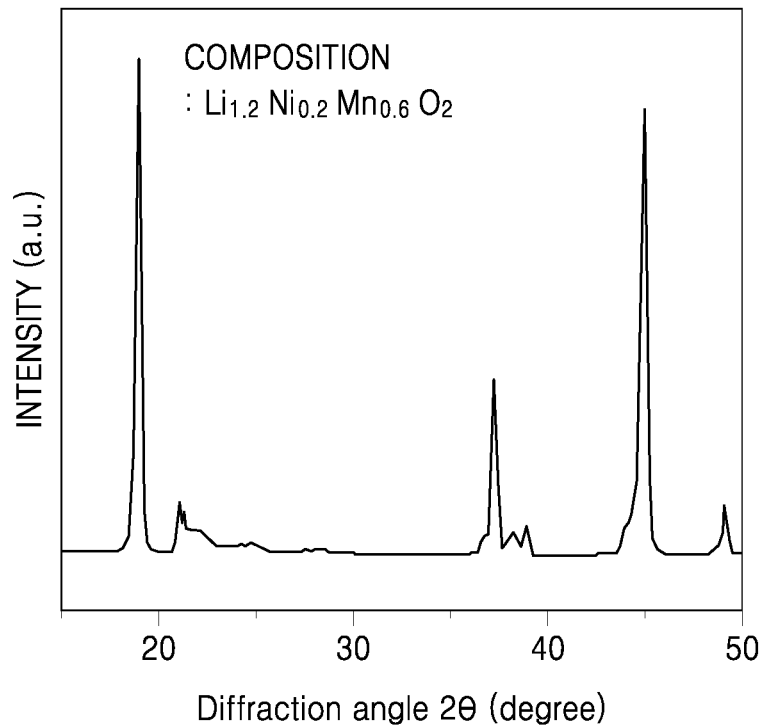
Figure 10B:
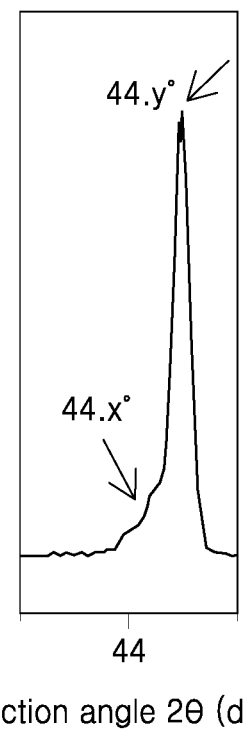

FIG. 4 is a flowchart illustrating a second method according to another embodiment of preparing the composite positive active material according to an embodiment. The preparation method of FIG. 4 may further include performing a second thermal treatment on the precursor mixture, before the pulverizing of the precursor mixture in the preparation method of FIG. 3.

In the second preparation method of FIG. 4 according to an embodiment, the precursors may be mixed together to obtain a precursor mixture (S100). Then, a second thermal treatment may be performed on the precursor mixture to obtain a second thermal treatment product (S200). Then, the second thermal treatment product may be pulverized to obtain a pulverized product (S300). The pulverized product may then be subjected to a first thermal treatment to obtain a first thermal treatment product (S400). Then, the first thermal treatment product may be subjected to rapid cooling (S500)

The second preparation method of FIG. 4 is the same as the first preparation method described above with reference to FIG. 3, except for the second thermal treatment (S200), and thus additional detailed description of the other steps will be omitted here for clarity.

The second thermal treatment may be performed at the same temperature under the same gas atmosphere as in the first thermal treatment.

The second thermal treatment may be performed, for example, at a temperature of about 900° C. or greater, for example, at a temperature of about 900° C. to about 1000° C. Through the second thermal treatment, materials having different layered phase structures may be synthesized.

Next, after the second thermal treatment product is pulverized, the first thermal treatment may be performed. Then, through rapid cooling (quenching), a Li-rich composite oxide (composite positive active material) may be prepared in which interdiffusion of lithium and the transition metal may occur in the materials having the different layered phase structures and reaction of cations/anions, and in particular, of oxygen anions may be activated.

According to the second preparation method of FIG. 4, after the preparation of the materials having different layered phase structures, a change in localized structure may occur due to interaction of the materials having the different layered phase structure, and interdiffusion of lithium and the transition metal may be induced by control of a cooling method, a thermal treatment temperature, or the like, to thereby prepare a target composite positive active material.

The composite positive active material according to any of the above-described embodiments may be used in a positive electrode for a lithium battery. A lithium battery according to an embodiment may include the positive electrode. The lithium battery may have improved cycle characteristics and thermal stability by inclusion of the positive electrode including the composite positive active material according to any of the above-described embodiments.

The lithium battery according to an embodiment may be manufactured according to the following exemplary method. However, embodiments are not limited thereto, and manufacturing conditions may be varied as desired.

A positive electrode may be manufactured according to the following method.

A positive active material, a binding agent, and a solvent may be mixed together to prepare a positive active material composition. A conducting agent may be further added into the positive active material composition.

The positive active material composition may be directly coated on a positive electrode current collector and then dried to obtain a positive electrode. In some other embodiments, the positive active material composition may be cast on a separate support to form a positive active material film. This positive active material film may then be separated from the support and laminated on a positive electrode current collector, thereby obtaining a positive electrode.

The positive active material may be the composite positive active material according to any of the above-described embodiments. The positive active material may further include, in addition to the composite positive active material according to any of the embodiments, a first positive active material which is a positive active material commonly used in lithium batteries.

The first positive active material may include a lithium cobalt oxide, a lithium nickel cobalt manganese oxide, a lithium nickel cobalt aluminum oxide, a lithium iron phosphate, a lithium manganese oxide, or a combination thereof. However, embodiments are not limited thereto. Any positive active material available in the art may be used.

For example, the first positive active material may be a compound represented by: $Li_aA_{1-b}B'_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulas, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The conducting agent may be, for example, carbon black, natural graphite, artificial graphite, acetylene black, ketjen black, carbon fiber; carbon nanotubes, metal powder, metal fibers, or metal tubes of such as copper, nickel, aluminum, silver, and the like; or a conductive material such as a polyphenylene derivative. However, embodiments are not limited thereto. Any suitable conducting agent available in the art may be used.

The binder may be, for example, vinylidenefluoride/hexafluoropropylene copolymer, polyvinylidene fluoride (PVDF), polyimide, polyethylene, polyester, polyacrylonitrile, polymethylmethacrylate, polytetrafluoroethylene (PTFE), a carboxymethyl cellulose-styrene-butadiene rubber (CMC/SBR) copolymer, a styrene-butadiene rubber-based polymer, or a combination thereof.

The solvent may be, for example, N-methylpyrrolidone (NMP), acetone, water, or the like. However, embodiments are not limited thereto. Any suitable material available as a solvent in the art may be used.

The amounts of the composite positive active material, the conducting agent, the binder, and the solvent may be the levels as used in lithium batteries in the art. At least one of the conducting agent, the binder, and the solvent may be omitted depending on the use and structure of a lithium battery.

Next, a negative electrode may be manufactured in the following manner.

For example, the negative electrode may be prepared in substantially the same manner as applied to the positive electrode, except that a negative active material is used instead of the composite positive active material. Examples of a conducting agent, a binder, and a solvent for a negative active material composition may be substantially the same as those for the positive electrode described above.

For example, the negative active material, the conducting agent, the binder, and the solvent may be mixed together to form a negative active material composition. The negative active material composition may be directly coated on a copper current collector to obtain a negative electrode. In some other embodiments, the negative active material composition may be cast on a separate support to form a negative active material film. This negative active material film may then be separated from the support and laminated on a copper current collector, thereby obtaining a negative electrode.

The negative active material may be any suitable material available as a negative active material for lithium batteries. For example, the negative active material may include lithium metal, a metal alloyable with lithium, a semimetal alloyable with lithium, a transition metal oxide, a non-transition metal oxide, a carbonaceous material, or a combination thereof.

The metal alloyable with lithium may be, for example, Sn, Al, Ge, Pb, Bi, Sb, a Si—Y' alloy (wherein Y' may be an alkali metal, an alkaline earth metal, a Group 13 element, a Group 14 element, a Group 15 element, a Group 16 element, a transition metal, a rare earth element, or a combination thereof, but Y' is not Si), an Sn—Y' alloy (wherein Y' may be an alkali metal, an alkaline earth metal, a Group 13 element, a Group 14 element, a Group 15 element, a Group 16 element, a transition metal, a rare earth element, or a combination thereof, but Y' is not Sn), or a combination thereof. The semimetal alloyable with lithium may be, for example, Si. In some embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof.

The transition metal oxide may be, for example, a lithium titanium oxide, a vanadium oxide, or a lithium vanadium oxide.

The non-transition metal oxide may be, for example, $SnO_2$, $SiO_x$ (wherein $0<x<2$), or the like.

The carbonaceous material may be, for example, crystalline carbon, amorphous carbon, or a mixture thereof. The crystalline carbon may be, for example, graphite such as natural graphite or artificial graphite in nonshaped, plate-like, flake-like, spherical or fibrous form. The amorphous carbon may be soft carbon (carbon sintered at low temperatures), hard carbon, meso-phase pitch carbonization products, sintered cokes, or the like.

The amounts of the negative active material, the conducting agent, the binder, and the solvent may be determined by one of skill in the art of lithium batteries without undue experimentation. At least one of the conducting agent, the binder, or the solvent may be omitted depending on the use and structure of a lithium battery.

Next, a separator to be interposed between the positive electrode and the negative electrode may be prepared.

The separator may be any suitable separator used in lithium batteries. The separator may have low resistance to migration of ions in an electrolyte and excellent electrolyte-retaining ability. For example, the separator may be glass fiber, polyester, Teflon, polyethylene, polypropylene, polytetrafluoroethylene (PTFE), or a combination thereof, which may be a non-woven or woven fabric. For example, a rollable separator such as polyethylene or polypropylene may be used for a lithium ion battery. A separator with good electrolyte-retaining ability may be used for a lithium ion polymer battery.

For example, the separator may be manufactured in the following manner. However, embodiments are not limited thereto, and the method of manufacturing the separator may be varied.

A polymer resin, a filler, and a solvent may be mixed together to prepare a separator composition. The separator composition may be directly coated on an electrode and then dried to form the separator. In some other embodiments, the separator composition may be cast on a support and then dried to form a separator film. This separator film may be separated from the support and laminated on an electrode to thereby form the separator.

The polymer resin used in preparing the separator is not specifically limited. Any suitable material available as a binder for an electrode plate may be used. For example, the polymer resin may be a vinylidenefluoride/hexafluoropropylene copolymer, polyvinylidene fluoride (PVDF), polyacrylonitrile, polymethylmethacrylate, or a mixture thereof.

Next, an electrolyte may be prepared. The electrolyte may be, for example, an organic liquid electrolyte. For example, the organic liquid electrolyte may be prepared by dissolving a lithium salt in an organic solvent.

The organic solvent may be any suitable solvent available as an organic solvent in the art. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof.

In an embodiment, the lithium salt may be any suitable material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may each independently a natural number), LiCl, LiI, or a combination thereof.

In some other embodiments, the electrolyte may be a solid electrolyte. The solid electrolyte may be, for example, boron oxide, lithium oxynitride, or the like. However, embodiments are not limited thereto. Any suitable solid electrolyte available in the art may be used. The solid electrolyte may be formed on the negative electrode, for example, by sputtering or by stacking a separate solid electrolyte sheet on the negative electrode.

Figure 12:
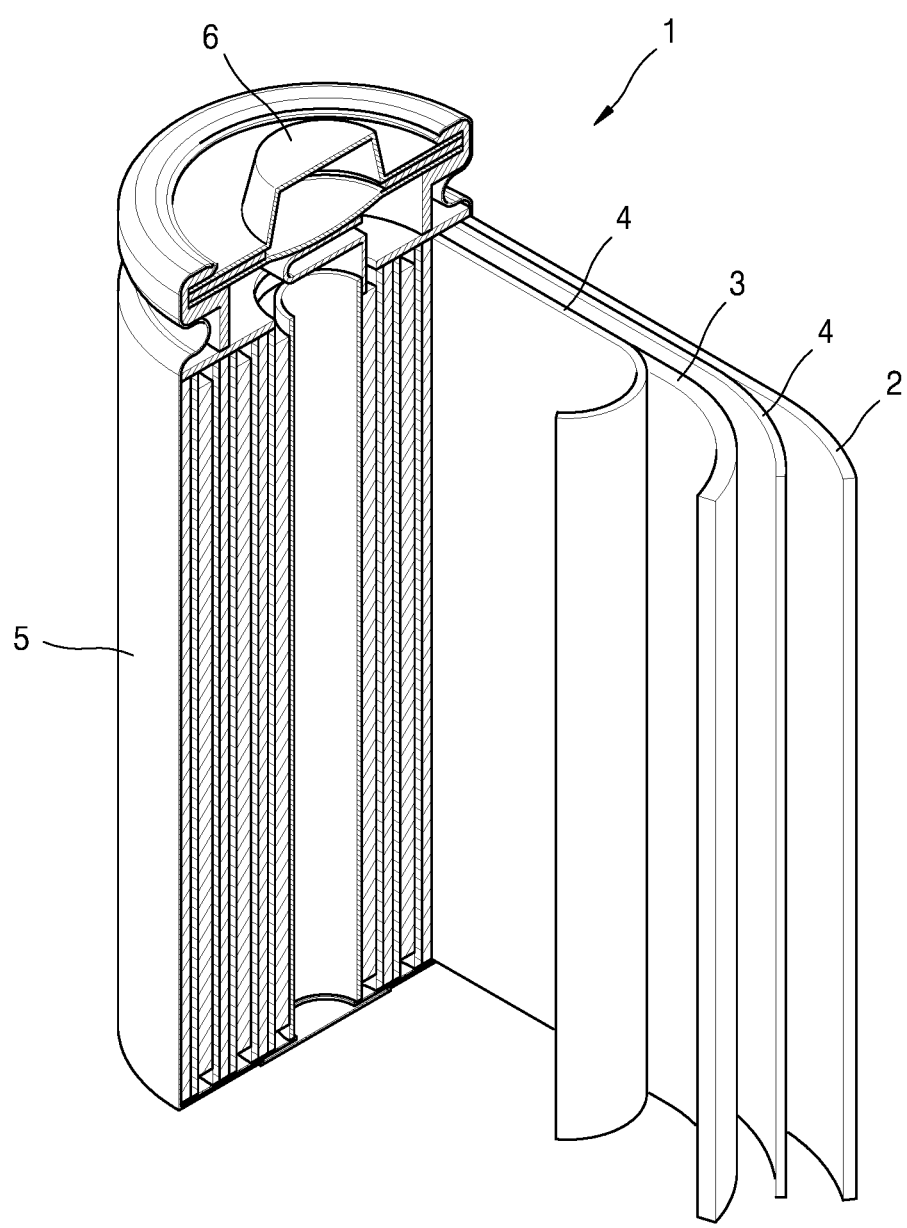
FIG. 12 is a schematic view illustrating an embodiment of a structure of a lithium battery.

Referring to FIG. 12, a lithium battery 1 according to an embodiment may include a positive electrode 3 including the composite positive active material according to any of the above-described embodiments, a negative electrode 2, and a separator 4. The positive electrode 3, the negative electrode 2, and the separator 4 may be wound or folded, and then accommodated in a battery case 5. Then, the battery case 5 may be filled with an organic liquid electrolyte and sealed with a cap assembly 6, thereby completing the manufacture of the lithium battery 1. The battery case 5 may be a cylindrical type. However, embodiments are not limited thereto. The battery case 5 may be, for example, a rectangular type, a thin film type, or the like.

For example, a pouch type lithium battery may include a battery assembly. The separator may be arranged between the positive electrode and the negative electrode to thereby form a battery assembly. In some embodiments, the battery assembly may be stacked in a bi-cell structure and then impregnated with an organic liquid electrolyte. Then, the resulting assembly may be put into a pouch and hermetically sealed to thereby complete the manufacture of a pouch type lithium battery. In some embodiments, a plurality of battery assemblies may be stacked to form a battery pack, which may be used in any device which requires high capacity and high output, for example, in a laptop computer, a smart phone, an electric vehicle, or the like.

The lithium battery 1 may have improved lifetime characteristics and high-rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

A lithium battery including the composite positive active material according to any of the embodiments may have a capacity of about 210 mAh/g or greater and may maintain improved lifetime characteristics even after 50 or more charge-discharge cycles.

Embodiments of the disclosure will now be described in detail with reference to the following examples. However, these examples are only for illustrative purposes and are not intended to limit the scope of the embodiments of the disclosure.

EXAMPLES

Example 1: Preparation of Composite Positive Active Material

A composite positive active material represented by the formula of $Li_{1.2}Ni_{0.2}Mn_{0.6}O_2$ was prepared in the following manner.

First, as precursors for a solid-phase reaction, $Li_2CO_3$ (having a purity of 99% or greater, Junsai), $NiCO_3$, (having a purity of 99% or greater, available from alpha A), and $MnO_2$ (having a purity of 99.9% or greater, available from alpha A) were combined in the following molar ratio: 0.6 $Li_2CO_3$+0.2 $NiCO_3$+0.6 $MnO_2$.

In particular, 1 g of $Li_2CO_3$, 0.536 g of $NiCO_3$, and 1.17 g of $MnO_2$ were prepared according to 50 mol % of $LiNi_{0.5}Mn_{0.5}O_2$ and 50 mol % of $Li_2MnO_3$ and mixed at the same time.

The precursors were added to an acetone solvent and then ball milled for about 12 hours such that the agglomerated powder of each precursor disintegrated, to thereby form a uniform mixture of the precursors. Zirconia balls having a diameter of about 3.5 mm and about 10 mm were used for the ball milling.

After the powder of the precursors was mixed by the ball milling, the obtained precursor mixture was dried in the air atmosphere using a hot plate at about 100° C. or less and then pulverized using a high-energy ball mill for about 6 hours, wherein zirconia balls having a diameter of about 1 millimeter (mm) were used in the high-energy ball mill, to thereby obtain a precursor mixture having a particle size of about 0.1 μm to about 0.2 μm through the high-energy ball milling.

After pulverizing the powder of the precursor mixture by the ball milling, the precursor mixture was dried in the air atmosphere using a hot plate at about 100° C. or less, and then the dried precursor mixture was pelletized using a disc type mold. Then, the obtained pellets were thermally treated in a furnace at about 900° C. for about 5 hours at a heating rate of about 4° C./min. Immediately after the heating, the pellets were taken out of the furnace and then subjected to rapid cooling (quenching) in the air atmosphere at about 900° C. to thereby obtain the composite positive active material. A cooling rate at the quenching was about 900° C./min.

Example 2: Preparation of Composite Positive Active Material

A composite positive active material represented by the formula of $Li_{1.2}Ni_{0.2}Mn_{0.6}O_2$ was prepared in the following manner.

The composite positive active material was obtained in the same manner as in Example 1, except that the order of adding the lithium precursor, the nickel precursor, and the manganese precursor and the thermal treatment temperature were varied as follows.

First, as precursors, 0.536 g of $NiCO_3$, and 1.17 g of $MnO_2$ were added to an acetone solvent and then ball milled for about 6 hours. Then, 1 g of $Li_2CO_3$ was added and ball milled for about 6 hours, while the agglomerated powder of the precursors was disintegrated, to thereby form a uniform mixture of the precursors. Zirconia balls having a diameter of about 3.5 mm and about 10 mm were used for the ball milling.

After the powder of the precursors was mixed by the ball milling, the obtained precursor mixture was dried in the air atmosphere using a hot plate at about 100° C. or less and then pulverized using a high-energy ball mill for about 6 hours, wherein zirconia balls having a diameter of about 1 mm were used in the high-energy ball mill.

Then, the precursor mixture was dried in the air atmosphere using a hot plate at about 100° C. or less, and then thermally treated in a furnace at about 900° C. for about 10 hours at a heating rate of about 4° C./min. Immediately after the heating, the precursor mixture was taken out of the furnace and then subjected to rapid cooling (quenching) in the air at about 900° C. to thereby obtain the composite positive active material. A cooling rate at the quenching was about 900° C./min.

Example 3: Preparation of Composite Positive Active Material

A composite positive active material represented by the formula of $Li_{1.2}Ni_{0.2}Mn_{0.6}O_2$ was prepared.

Unlike Example 1 in which the quenching was performed during calcination, in Example 3, after phase synthesis through calcination, quenching was performed during high-energy ball milling and annealing processes.

As precursors, 1 g of $Li_2CO_3$, 0.536 g of $NiCO_3$, and 1.17 g of $MnO_2$ were mixed together according to 50 mol % of $LiNi_{0.5}Mn_{0.5}O_2$ and 50 mol % of $Li_2MnO_3$.

The precursors were added to an acetone solvent and then ball milled for about 12 hours such that agglomerated powder of the precursors disintegrated, to thereby prepare a uniform mixture of the precursors. Zirconia balls having a diameter of about 3.5 mm and about 10 mm were used for the ball milling.

After the powder of the precursors was mixed by the ball milling, the obtained precursor mixture was dried in the air using a hot plate at about 100° C. or less, and then the dried precursor mixture was pelletized using a disc type mold.

Then, the obtained pellets were loaded into an alumina crucible and thermally treated in the air atmosphere at about 900° C., for about 5 hours, and then cooling was performed in air to cool to room temperature. After cooling to room temperature, the resultant was pulverized in a high-energy ball mill for about 2 hours and 20 minutes, wherein zirconia balls having a diameter of about 1 mm were used in the high-energy ball mill After pulverizing the powder of the precursor mixture by the ball milling, the precursor mixture was dried in the air using a hot plate at about 100° C. or less, and then the dried precursor mixture was pelletized using a disc type mold.

Then, the obtained pellets were thermally treated in a furnace at about 900° C. for about 5 hours at a heating rate of about 4° C./min. Immediately after the heating, the pellets were taken out of the furnace and then subjected to rapid cooling (quenching) in the air at about 900° C. to thereby obtain the composite positive active material. A cooling rate at the quenching was about 900° C./min.

Comparative Example 1

A composite positive active material was obtained in the same manner as in Example 1, except that the pulverizing of the precursor mixture using a high-energy ball mill was not performed.

Comparative Example 2

A composite positive active material was prepared in the same manner as in Example 3, except that the preparation process was varied as follows.

After pulverizing the powder of the precursor mixture by the ball milling, the precursor mixture was dried in the air using a hot plate at about 100° C. or less, and then the dried precursor mixture was pelletized using a disc type mold. Then, the obtained pellets were thermally treated (re-annealing) in a furnace at about 700° C. for about 5 hours at a heating rate of about 4° C./min. Immediately after the heating, the pellets were taken out of the furnace and then subjected to rapid cooling (quenching) to thereby obtain the composite positive active material.

Comparative Example 3: Preparation of Composite Positive Active Material

A composite positive active material was prepared in the same manner as in Example 3, except that the preparation process was varied as follows.

After pulverizing the powder of the precursor mixture by the ball milling, the precursor mixture was dried in the air using a hot plate at about 100° C. or less, and then the dried precursor mixture was pelletized using a disc type mold. Then, the obtained pellets were thermally treated (re-annealing) in a furnace at about 900° C. for about 5 hours at a heating rate of about 4° C./min. Immediately after the heating, the pellets were taken out of the furnace and then subjected to slow cooling in the air at a cooling rate of about 5° C./min to thereby obtain the composite positive active material.

Example 4: Manufacture of Lithium Battery 70 wt % of the composite positive active material of Example 1 as a positive active material, 25 wt % of Super P as carbon powder, and 5 wt % of PVDF as a binder were mixed together in a mortar for about 20 minutes to about 30 minutes, and then stirred for about 2 hours to prepare a positive active material slurry. The positive active material slurry was coated on an aluminum (Al) foil and then dried in a vacuum chamber for about 12 hours. Then, a positive electrode having a weight of about 1 mg to about 3 mg was punched out from the dried product using an 8-mm punch in a glove box (argon atmosphere). Then, a cell assembling process was performed using the positive electrode, a lithium metal as a negative electrode, a separator obtained by cutting Celgard 2400 to a size of about 13 mm, and an electrolyte obtained by dissolving 1M $LiPF_6$ in a 1:1 (v/v) mixed solution of ethylene carbonate and dimethyl carbonate.

Examples 5 and 6: Manufacture of Lithium Battery

Lithium batteries were manufactured in the same manner as in Example 4, except that the composite positive active material of Example 2 and the composite positive active material of Example 3 were used, respectively, instead of the composite positive active material of Example 1.

Comparative Examples 4 to 6: Manufacture of Lithium Battery

Lithium batteries were manufactured in the same manner as in Example 4, except that the composite positive active material of Comparative Example 1 to the composite positive active material of Comparative Example 3 were used, respectively, instead of the composite positive active material of Example 1.

Evaluation Example 1: X-Ray Diffraction (XRD) Analysis

The composite positive active materials prepared according to Examples 1 to 3 and the composite positive active materials prepared according to Comparative Examples 1 to 3 were analyzed by X-ray diffraction (XRD) spectroscopy using an X'pert pro (available from PANalytical) with Cu Kα radiation (1.54056 Å).

The XRD analysis results are shown in FIGS. 5A to 10B, respectively. The following characteristics (1) to (3) were analyzed based on the results of FIGS. 5A to 10B. The results are shown in Table 1.

(1) Cation Mixing Ratio

Using Equation 1, a cation mixing ratio was calculated from an intensity ratio of a peak corresponding to (003) plane (peak at 2θ of about 18°-19°) and a peak corresponding to (104) plane (peak at 2θ of about 44.5°).

$$\text{Cation mixing ratio} = \{I_{(003)}/I_{(104)}\} \times 100 \quad \text{Equation 1}$$

In Equation 1, $I_{(003)}$ is the intensity of the peak corresponding to (003) plane, and $I_{(104)}$ is the intensity of the peak corresponding to (104) plane.

The peak corresponding to (003) plane provides information on a layered phase structure of the composite positive active material, and the peak corresponding to (104) plane provides information on a layered and cubic rock-salt structure. As is apparent from Equation 1, the larger the ratio of $I_{(003)}/I_{(104)}$, the larger the cation mixing ratio becomes.

(2) FWHM, peat at 43°-45° 2θ

The FWHM indicates a width of the peak corresponding to (104) plane (peak at 43°-45° 2θ, i.e., about 44.5° 2θ) at one half of the maximum height of the intensity of the peak.

(3) Ratio of I(44.x°)/I(44.y°)

I(44.x°) is the intensity of a peak in a shoulder region at 2θ of about 44°, and I(44.y°) is the intensity of a main peak at 2θ of about 44.° The intensity ratio of the peaks were evaluated.

Table 1

TABLE 1

| Example | I(003)/I(104) | FWHM (43°-45°peak) | I(44.x°)/I(44.y°) |
|---|---|---|---|
| Example 1 | 0.87 | 0.24 | 0.008 |
| Example 2 | 1.31 | 0.32 | 0.20 |
| Example 3 | 1.11 | 0.24 | 0.05 |
| Comparative Example 1 | 1.25 | 0.31 | 0.21 |
| Comparative Example 2 | 1.31 | 0.31 | 0.25 |
| Comparative Example 3 | 1.12 | 0.31 | 0.21 |

Referring to Table 1, the composite positive active materials of Examples 1 to 3 and the composite positive active materials of Comparative Examples 1 to 3 were all found to have a cation mixing ratio ($I_{(003)}/I_{(104)}$) of 1.35 or less, indicating that the composite positive active materials of Examples 1 to 3 had a layered phase structure similar to that of the composite positive active material of Comparative Examples 1 to 3. However, the composite positive active materials of Examples 1 to 3 had a ratio of I(44.x°)/I(44.y°) of 0.20 or less, while the composite positive active materials of Comparative Examples 1 to 3 had a ratio of I(44.x°)/I(44.y°) of 0.21 or greater. The composite positive active materials of Examples 1 and 3 were found to have a reduced FWHM, as compared with that of the positive active materials of Comparative Examples 1 to 3. These results indicate that two peaks were merged in the composite positive active materials of Examples 1 and 3 due to atomic interdiffusion reaction, while two peaks appeared separate from one another in the composite positive materials of Comparative Examples 1 to 3 since the atom interdiffusion reaction did not occur.

Evaluation Example 2: Charge-Discharge Cycle Characteristics

The lithium batteries of Examples 4 to 6 and Comparative Examples 4 to 6 were charged at about 25° C. with a constant current of 0.05 C (about 14 mA/g) until a voltage of 4.7 V (with respect to Li) was reached, and then discharged with a constant current of 0.05 C until a voltage of 2.5 V (with respect to Li) was reached (1st cycle, formation cycle. The C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes. Charge and discharge cycle characteristics of the lithium batteries of Examples 4 to 6 and Comparative Examples 4 to 6 are partially shown in FIG. 11.

Figure 11:
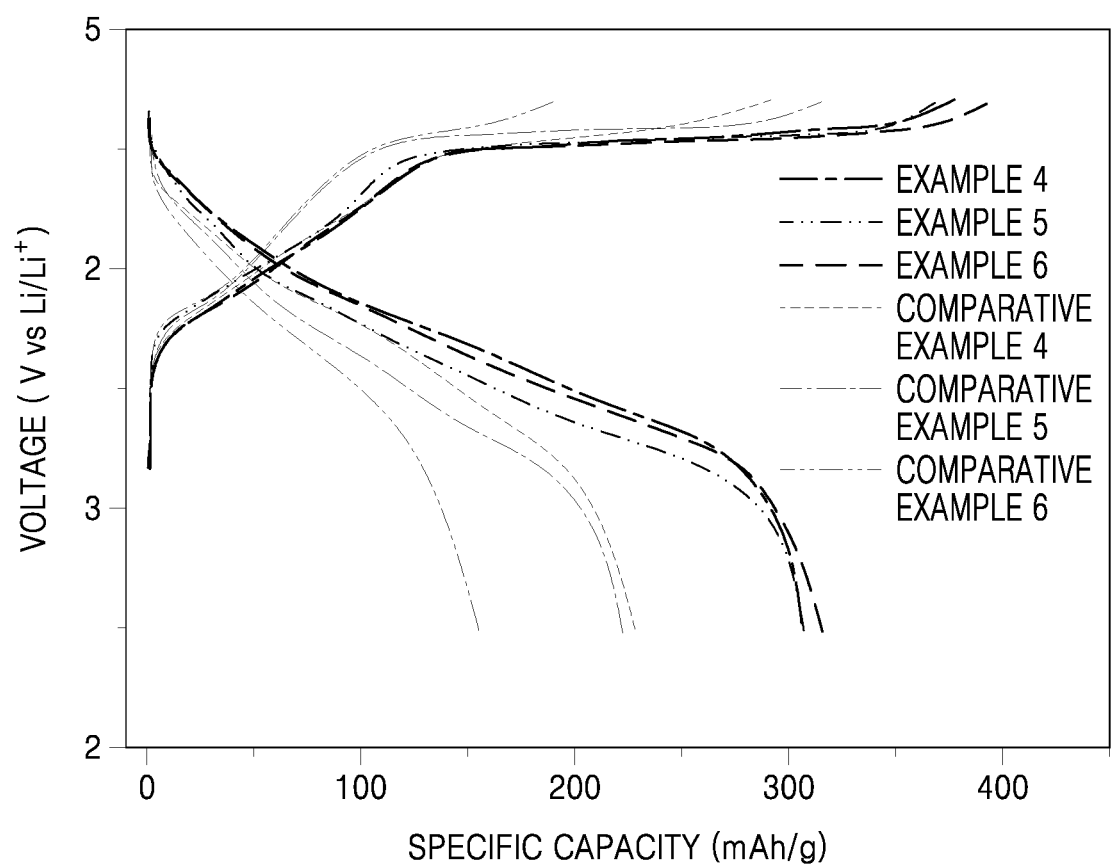
FIG. 11 is a graph of Voltage (V) vs. $Li/Li^+$) versus Specific Capacity (milliampere-hours per gram, mAh/g) illustrating charge-discharge cycle characteristics of the lithium batteries of Examples 4 to 6 and the lithium batteries of Comparative Examples 4 to 6.

Referring to FIG. 11, the lithium batteries of Examples 4 to 6 were found to have improved charge and discharge cycle characteristics, as compared with the lithium batteries of Comparative Examples 4 to 6.

As described above, according to an embodiment, a composite positive active material represented by Formula 1 may utilize multiple redox reactions and accordingly, may have improved capacity. The composite positive active material is structurally stable, and thus may effectively suppress a voltage reduction.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A composite positive active material represented by Formula 1, $$Li_aNi_bCO_cMn_dM_eO_2 \quad \text{Formula 1}$$

wherein, in Formula 1,

M is zirconium, aluminum, rhenium, vanadium, chromium, iron, gallium, silicon, boron, ruthenium, titanium, niobium, molybdenum, magnesium, or platinum, $1.1 \leq a \leq 1.3$, $b+c+d+e \leq 1$, $0 \leq b \leq 0.3$, $0 \leq c \leq 0.3$, $0 < d \leq 0.6$, and $0 \leq e \leq 0.1$, and wherein, through atomic interdiffusion of lithium and the metal, the composite positive active material has a uniform distribution of lithium excess regions, and a uniform degree of disorder of metal cations, and the metal cations have a disordered, irregular arrangement at an atomic scale and a mixed disordered cation structure, wherein a ratio of an intensity of a (003) peak to an intensity of a (104) peak is about 0.87 to about 1.11, when the composite positive active material is analyzed by X-ray diffraction using Cu Kα radiation, and wherein a full width at half-maximum of a diffraction peak between 43° and 45° 2θ of the composite positive active material is about 0.2° to about 0.32°, when the composite positive active material is analyzed by X-ray diffraction using Cu Kα radiation.

2. The composite positive active material of claim 1, wherein the composite positive active material comprises
a layered phase structure in which a metal layer and a lithium layer are not distinguishable from one another, when the composite positive active material is analyzed by X-ray diffraction using Cu Kα radiation.

3. The composite positive active material of claim 2, wherein a ratio of I(44.x°)/I(44.y°) is 0.2 or less, when the composite positive active material is analyzed by X-ray diffraction using Cu Kα radiation.

4. The composite positive active material of claim 1, wherein a full width at half-maximum of a diffraction peak between 43° and 45° 2θ of the composite positive active material is from 0.24° to less than 0.31°, when the composite positive active material is analyzed by X-ray diffraction using Cu Kα radiation.

5. The composite positive active material of claim 1, wherein ordering of lithium excess regions is not observed when the composite positive active material is analyzed by high-angle annular dark-field/annular bright-field imaging-scanning transmission electron microscopy.

6. The composite positive active material of claim 1, wherein ordering of Li, Ni, Co, Mn, and M cations is not observed when the composite positive active material is analyzed by high-angle annular dark-field/annular bright-field imaging-scanning transmission electron microscopy.

7. The composite positive active material of claim 1, wherein the composite positive active material is a composite represented by Formula 2:

$$aLi_{1+x}Ni_{0.5-x}Mn_{0.5}O_2 \cdot bLi_{2-y}Ni_yMnO_3 \quad \text{Formula 2}$$

wherein, in Formula 2, 0≤x<0.2, 0≤y<0.2, 0<a<1, 0<b<1, a+b=1, and ax=by.

8. The composite positive active material of claim 1, wherein the composite positive active material is $Li_{1.2}Ni_{0.2}Mn_{0.6}O_2$, $Li_{1.2}Ni_{0.3}Mn_{0.3}O_2$, $Li_{1.1}Ni_{0.3}Mn_{0.6}O_2$, or a combination thereof.

9. The composite positive active material of claim 1, wherein the composite positive active material has a capacity of about 275 milliampere-hours per gram or greater.

10. A positive electrode comprising the composite positive active material according to claim 1.

11. The positive electrode of claim 10, wherein a ratio of I(44.x°)/I(44.y°) is 0.2 or less, when the composite positive active material is analyzed by X-ray diffraction using Cu Kα radiation.

12. The positive electrode of claim 10, wherein a full width at half-maximum of a diffraction peak between 43° and 45° 2θ of the composite positive active material is about 0.2° to about 0.32°, when the composite positive active material is analyzed by X-ray diffraction using Cu Kα radiation.

13. The positive electrode of claim 10, wherein ordering of lithium excess regions is not observed when the composite positive active material is analyzed by high-angle annular dark-field/annular bright-field imaging-scanning transmission electron microscopy.

14. The positive electrode of claim 10, wherein ordering of Li, Ni, Co, Mn, and M cations is not observed when the composite positive active material is analyzed by high-angle annular dark-field/annular bright-field imaging-scanning transmission electron microscopy.

15. The positive electrode of claim 10, wherein the composite positive active material is a composite represented by Formula 2:

$$aLi_{1+x}Ni_{0.5-x}Mn_{0.5}O_2 \cdot bLi_{2-y}Ni_yMnO_3 \quad \text{Formula 2}$$

wherein, in Formula 2, 0≤x<0.2, 0≤y<0.2, 0<a<1, 0<b<1, a+b=1, and ax=by.

16. The positive electrode of claim 10, wherein the composite positive active material is $Li_{1.2}Ni_{0.2}Mn_{0.6}O_2$, $Li_{1.2}Ni_{0.3}Mn_{0.3}O_2$, $Li_{1.1}Ni_{0.3}Mn_{0.6}O_2$, or a combination thereof.

17. The positive electrode of claim 10, wherein the composite positive active material has a capacity of about 275 milliampere-hours per gram or greater.

18. A lithium battery comprising:
the positive electrode of claim 10;
a negative electrode; and
an electrolyte between the positive electrode and the negative electrode.

19. A method of preparing a composite positive active material, the method comprising:
mixing a precursor for forming a composite positive active material represented by Formula 1 to obtain a precursor mixture;
pulverizing the precursor mixture to obtain a pulverized product;
first thermally treating the pulverized product to obtain a first thermal treatment product; and
cooling the first thermal treatment product, wherein the cooling comprises cooling at a cooling rate of about 500° C. per minute to about 900° C. per minute,

$$Li_aNi_bCo_cMn_dM_eO_2 \quad \text{Formula 1}$$

wherein, in Formula 1, M is zirconium, aluminum, rhenium, vanadium, chromium, iron, gallium, silicon, boron, ruthenium, titanium, niobium, molybdenum, magnesium, or platinum,
1.1≤a≤1.3, b+c+d+e≤1, 0≤b≤0.3, 0≤c≤0.3, 0<d≤0.6, and 0≤e≤0.1, and
wherein, through atomic interdiffusion of lithium and the metal, the composite positive active material has
a uniform distribution of lithium excess regions, and a uniform degree of disorder of metal cations, and
the metal cations have a mixed disordered, irregular arrangement at an atomic scale and a disordered cation structure,
a ratio of an intensity of a (003) peak to an intensity of a (104) peak is about 0.87 to about 1.11, when the composite positive active material is analyzed by X-ray diffraction using Cu Kα radiation, and
wherein a full width at half-maximum of a diffraction peak between 43° and 45° 2θ of the composite positive active material is about 0.2° to about 0.32°, when the composite positive active material is analyzed by X-ray diffraction using Cu Kα radiation.

20. The method of claim 19, wherein the first thermally treating comprises contacting with an oxidizing gas at a temperature of about 900° C. or greater.

21. The method of claim 20, further comprising second thermally treating the precursor mixture before the pulverizing of the precursor mixture.

22. The method of claim 21, wherein the second thermally treating comprises contacting with an oxidizing gas at a temperature of about 700° C. or greater.

23. The method of claim 19, wherein the first thermally treating comprises contacting with an oxidizing gas at a temperature of about 900° ° C. to about 1100° C.

24. The method of claim 19, wherein the cooling comprises cooling from a temperature of about 900° C. or greater.

25. The method of claim 19, wherein the pulverizing comprises ball milling, water milling, air-jet milling, or roller milling.

26. The method of claim 19, wherein the pulverized product has a $D_{50}$ particle size of about 1 micrometer or less, when determined by light scattering.

27. The method of claim 19, wherein the precursor mixture comprises a lithium precursor, a nickel precursor, and a manganese precursor, and the mixing of the precursors comprises adding the lithium precursor to a mixture of the nickel precursor and the manganese precursor to obtain the precursor mixture.

28. The method of claim 19, wherein the precursor mixture comprises a lithium precursor, a nickel precursor, and a manganese precursor, and the mixing of the precursors comprises simultaneously adding and mixing the lithium precursor, the nickel precursor, and the manganese precursor to obtain the precursor mixture.

29. The method of claim 19, wherein the mixing of the precursors comprises mechanical milling.

30. The method of claim 19, further comprising, before the first thermally treating of the pulverized product, the method comprises drying the pulverized product at a temperature of about 100° C. or less to obtain a dried product, and pelletizing the dried product.

* * * * *